UNITED STATES PATENT OFFICE.

FANNIE E. PIERSON, OF GRAVITY, IOWA.

FOOD PRODUCT AND PROCESS OF MAKING SAME.

1,281,828.      Specification of Letters Patent.      Patented Oct. 15, 1918.

No Drawing.      Application filed April 27, 1918. Serial No. 231,206.

*To all whom it may concern:*

Be it known that I, FANNIE E. PIERSON, a citizen of the United States, residing at Gravity, in the county of Taylor and State of Iowa, have invented certain new and useful Improvements in Food Products and Processes of Making Same, of which the following is a specification.

This invention relates to a food product and process of preparing same, and has for its object to provide a food from corn, which will retain its flavor, may be kept in storage indefinitely and may be used in a variety of ways not heretofore practised. The invention includes the process of making, as well as the product itself.

The invention is fully described herein and is particularly pointed out in the appended claims.

The process consists in subjecting hulled corn to the action of acetic acid, after which, and before complete evaporation occurs, it is subjected to freezing, and is then evaporated.

Hulling the corn may be accomplished by any suitable means. If lye is employed for hulling the corn, the latter is cleansed before it is subjected to the action of the acid.

The acetic acid may be of ordinary quality, and no particular period is required for the hulled corn to remain frozen, and evaporation, after freezing, may proceed rapidly or gradual.

The acetic acid operates as a preservative, and freezing operates to break up the granules of starch, and when evaporated, the product may be stored an indefinite time before using, its flavor remaining unchanged.

The product is of particular advantage for use of the army and navy or for similar uses, since it may be served readily in various forms, will not be impaired by climatic changes and may be transported conveniently in bulk. However, it may be canned and delivered the same as beans or similar product. When fresh cooked it may be used as a food with milk. Also it may be ground or pounded to produce fritters or the like when fried in fats. It is a good food product used in soups, may be boiled, and has many other valuable uses.

The principal feature of advantage which distinguishes the product is that it is rendered semi-plastic and tender by the operation of freezing, another being that it will be in such a condition, on account of the process, that it may be used at any time or may be stored indefinitely without injury or loss of flavor.

It will be appreciated that the invention may be practised economically and that it brings into use a new and useful product, the cereal used being plentiful generally, and to be found in nearly all countries.

Having fully described my invention, what I claim and desire to secure by Letters Patent is,—

1. The herein described process for the treatment of corn, consisting of removing the hulls from the corn, subjecting the hulled corn to the action of acetic acid and thereafter subjecting it to freezing while moist with the acid.

2. A process for the treatment of hulled corn consisting of immersing the hulled corn in acetic acid, draining the acid from the corn, freezing the hulled corn after the acid has been drained therefrom and thereafter evaporating said corn.

3. A process for the treatment of hulled corn which consists in adding a preserving element to the hulled corn, subjecting the hulled corn thereafter to freezing and finally removing the moisture therefrom.

In testimony whereof, I have affixed my signature in presence of two witnesses.

FANNIE E. PIERSON.

Witnesses:
   ELMER BROWN,
   JUNE PIERSON.